US010638197B2

United States Patent
Bist et al.

(10) Patent No.: US 10,638,197 B2
(45) Date of Patent: Apr. 28, 2020

(54) SYSTEM AND METHOD FOR SEGMENT RELEVANCE DETECTION FOR DIGITAL CONTENT USING MULTIMODAL CORRELATIONS

(71) Applicant: Monet Networks, Inc., Newport Beach, CA (US)

(72) Inventors: Anurag Bist, Newport Beach, CA (US); Ramon Solves Pujol, Barcelona (ES); Eric Leopold Frankel, Santa Ana, CA (US)

(73) Assignee: Monet Networks, Inc., Newport Beach, CA (US)

( * ) Notice: Subject to any disclaimer, the term of this patent is extended or adjusted under 35 U.S.C. 154(b) by 0 days.

(21) Appl. No.: 16/198,503

(22) Filed: Nov. 21, 2018

(65) Prior Publication Data

US 2019/0297384 A1 Sep. 26, 2019

Related U.S. Application Data

(63) Continuation of application No. 15/595,841, filed on May 15, 2017, now abandoned, which is a (Continued)

(51) Int. Cl.
*H04N 21/442* (2011.01)
*H04N 21/475* (2011.01)
(Continued)

(52) U.S. Cl.
CPC ....... *H04N 21/4756* (2013.01); *G06F 16/436* (2019.01); *G06F 16/437* (2019.01);
(Continued)

(58) Field of Classification Search
CPC .......... H04N 21/44218; H04N 21/4756; G06F 16/436; G06K 9/00302; G06K 9/00308; G06K 9/00315
See application file for complete search history.

(56) References Cited

U.S. PATENT DOCUMENTS

| 6,293,904 B1 | 9/2001 | Blazey |
| 6,585,521 B1 * | 7/2003 | Obrador ................. G09B 23/28 369/27.01 |

(Continued)

OTHER PUBLICATIONS

U.S. Appl. No. 16/203,400, filed Nov. 28, 2018, Bist, Anurag.

*Primary Examiner* — Robert J Hance
(74) *Attorney, Agent, or Firm* — Henry J. Cittone; Cittone Demers & Arneri LLP

(57) ABSTRACT

A system and method for media content evaluation based on combining multi-modal inputs from the audiences that may include reactions and emotions that are recorded in real-time on a frame-by-frame basis as the participants are watching the media content is provided. The real time reactions and emotions are recorded in two different campaigns with two different sets of people and which include different participants for each. For the first set of participants facial expression are captured and for the second set of participants reactions are captured. The facial expression analysis and reaction analysis of both set of participants are correlated to identify the segments which are engaging and interesting to all the participants.

16 Claims, 12 Drawing Sheets

Related U.S. Application Data continuation of application No. 14/942,182, filed on Nov. 16, 2015, which is a continuation-in-part of application No. 13/291,064, filed on Nov. 7, 2011, now Pat. No. 9,202,251.

(51) Int. Cl.

| | | |
|---|---|---|
| *H04N 21/258* | (2011.01) | |
| *H04N 21/4223* | (2011.01) | |
| *H04N 21/658* | (2011.01) | |
| *G06F 16/435* | (2019.01) | |
| *G06Q 30/02* | (2012.01) | |
| *H04N 21/234* | (2011.01) | |
| *H04N 21/8549* | (2011.01) | |
| *H04N 21/845* | (2011.01) | |
| *G06Q 50/00* | (2012.01) | |
| *G06F 16/78* | (2019.01) | |
| *G06K 9/00* | (2006.01) | |

(52) U.S. Cl.
CPC ......... *G06F 16/7867* (2019.01); *G06Q 30/02* (2013.01); *G06Q 50/01* (2013.01); *H04N 21/23418* (2013.01); *H04N 21/25891* (2013.01); *H04N 21/4223* (2013.01); *H04N 21/44218* (2013.01); *H04N 21/6582* (2013.01); *H04N 21/8455* (2013.01); *H04N 21/8456* (2013.01); *H04N 21/8549* (2013.01); *G06K 9/00302* (2013.01)

(56) References Cited

U.S. PATENT DOCUMENTS

| | | | |
|---|---|---|---|
| 9,202,251 B2 | 12/2015 | Bist | |
| 2002/0174425 A1 | 11/2002 | Markel | |
| 2003/0154180 A1 | 8/2003 | Case et al. | |
| 2006/0085419 A1 | 4/2006 | Rosen | |
| 2006/0235884 A1 | 10/2006 | Pfenninger | |
| 2007/0033531 A1 | 2/2007 | Marsh | |
| 2008/0032723 A1 | 2/2008 | Rosenberg | |
| 2008/0091515 A1 | 4/2008 | Thieberger | |
| 2008/0097822 A1 | 4/2008 | Schigel et al. | |
| 2008/0126115 A1 | 5/2008 | Bennett | |
| 2008/0133716 A1 | 6/2008 | Rao et al. | |
| 2008/0222671 A1 | 9/2008 | Lee | |
| 2009/0012925 A1 | 1/2009 | Brown | |
| 2009/0019467 A1* | 1/2009 | Kim | H04N 7/17318 725/14 |
| 2009/0106105 A1 | 4/2009 | Lewis | |
| 2009/0119268 A1 | 5/2009 | Bandaru | |
| 2009/0150919 A1 | 6/2009 | Lee | |
| 2009/0165030 A1* | 6/2009 | Cronin | H04H 60/33 725/14 |
| 2009/0204478 A1 | 8/2009 | Kaib | |
| 2009/0317060 A1* | 12/2009 | Han | G11B 27/034 386/248 |
| 2010/0017278 A1 | 1/2010 | Wilen | |
| 2010/0049534 A1 | 2/2010 | Whitnah | |
| 2010/0082751 A1 | 4/2010 | Meijer | |
| 2010/0099955 A1 | 4/2010 | Thomas | |
| 2010/0107075 A1 | 4/2010 | Hawthorne et al. | |
| 2010/0121672 A1 | 5/2010 | Kohler | |
| 2010/0138491 A1 | 6/2010 | Churchill et al. | |
| 2010/0144440 A1 | 6/2010 | Arrasvuori et al. | |
| 2010/0153983 A1 | 6/2010 | Philmon | |
| 2010/0250341 A1 | 9/2010 | Hauser | |
| 2010/0269158 A1 | 10/2010 | Ehler | |
| 2010/0312769 A1 | 12/2010 | Bailey | |
| 2011/0143728 A1 | 6/2011 | Holopainen | |
| 2011/0225021 A1 | 9/2011 | Kantak et al. | |
| 2011/0225043 A1 | 9/2011 | Bhatia | |
| 2011/0231240 A1 | 9/2011 | Schoen | |
| 2011/0264531 A1 | 10/2011 | Bhatia | |
| 2011/0301433 A1 | 12/2011 | Sadowsky | |
| 2011/0321175 A1 | 12/2011 | Slater | |
| 2012/0030696 A1 | 2/2012 | Smith | |
| 2012/0072939 A1 | 3/2012 | Crenshaw | |
| 2012/0124122 A1 | 5/2012 | Kaliouby | |
| 2012/0222057 A1 | 6/2012 | Sadowsky | |
| 2012/0222058 A1 | 8/2012 | Kaliouby | |
| 2012/0259240 A1 | 10/2012 | Llewellynn | |
| 2012/0265811 A1 | 10/2012 | Bist | |
| 2013/0014141 A1 | 1/2013 | Bhatia | |
| 2013/0145384 A1* | 6/2013 | Krum | G06Q 30/02 725/10 |
| 2013/0288212 A1 | 10/2013 | Bist | |
| 2014/0137144 A1* | 5/2014 | Jarvenpaa | H04N 21/25891 725/13 |
| 2014/0282651 A1* | 9/2014 | Baratz | H04N 21/222 725/13 |
| 2015/0350730 A1* | 12/2015 | el Kaliouby | A61B 5/165 725/12 |
| 2016/0015307 A1 | 1/2016 | Kothuri | |
| 2016/0063444 A1 | 3/2016 | Gupta | |
| 2016/0142767 A1* | 5/2016 | Shigeta | H04N 21/4223 725/12 |
| 2016/0241533 A1 | 8/2016 | Bist | |
| 2017/0171614 A1* | 6/2017 | el Kaliouby | G16H 50/70 |
| 2017/0251262 A1 | 8/2017 | Bist | |
| 2019/0213909 A1 | 7/2019 | Bist | |

* cited by examiner

SYSTEM AND METHOD FOR SEGMENT RELEVANCE DETECTION FOR DIGITAL CONTENT USING MULTIMODAL CORRELATIONS

CROSS-REFERENCE TO RELATED APPLICATIONS

This application is a continuation of U.S. patent application Ser. No. 15/595,841, filed on May 15, 2017, which is a continuation-in-part of U.S. patent application Ser. No. 14/942,182 filed Nov. 16, 2015, which is a continuation-in-part of U.S. application Ser. No. 13/291,064 files Nov. 7, 2011, issued as U.S. Pat. No. 9,202,251 on Dec. 1, 2015; the disclosures of which are hereby incorporated by reference in their entireties.

FIELD OF THE INVENTION

The present invention relates generally to a method for granular tagging of multimedia content in a connected network, and more particularly, to a system that has an ability to add meaningful contextual and personalized information to the content in a granular fashion.

BACKGROUND OF THE INVENTION

With the growth of connected infrastructure, social networking has become more ubiquitous in everyday lives. A large part of our lives is being dictated by online or otherwise accessible content, and how this content is influenced by the tools and the network that connect us. Recent examples include the changes in platforms like Facebook where they are using services like Spotify to deliver content to match people's preferences, partnership of Netflix with Facebook to make their content repository more 'social', Hulu's existing social media tools, and other similar services.

While the above attempts are steps towards making content more relevant for classification, these still don't address a few fundamental issues: (a) how to pin-point specific areas in a content (video or audio) file that could highlight the usefulness of the content in a particular context, (b) some indication of the "True" reactions of individuals, groups of individuals, or a large demography of people to a particular content, or a specific area of the content, (c) a method, or platform to make such granular tagging, rating, and search of content happen in a generic and scalable way.

In light of above, a method and a system for a scalable platform is provided that enables granular tagging of any multimedia or other web content over connected networks. The method of the invention provides an ability to go in much more granular within a content and enable a way to add meaningful contextual and personalized information to it, that could then be used for searching, classifying, or analyzing the particular content in a variety of ways, and in a variety of applications.

OBJECTS OF THE INVENTION

It is a primary object of the invention to provide a system for tagging the content based on the individual and personal cues of the users. One example of these cues is emotional profile or emotional score of the users.

It is a further object of the invention to provide a method for tagging a multimedia content in a granular manner.

It is still a further object of the invention to provide a system that provides a uniform way of continuous and granular tagging of the multimedia content via individual cues, emotional profiles, or emotional scores.

A further and related object of the invention is to provide a method of tagging the content with an instantaneous Emotional Score, an instantaneous Emotional Profile, or an individual cues score based on a specific user's reaction and at a specific time stamp of the content.

BRIEF SUMMARY OF THE INVENTION

In one aspect of the present invention, a system for tagging a content is provided. The system comprising: an authorizing module configured to authorize a request coming from a user through a client device to access one or more content; a capturing means to capture a user specific data in response to said one or more content; an application module for accessing said one or more content, analyzing the captured user specific data and to generate a user emotional profile for a complete duration for which the user has interacted with the content; a processing means to tag the user emotional profile with the content in a time granular manner. The authorizing means further comprising a user opt-in providing one or more options for the user to access the system. The system further comprising a storing means to store said one or more content tagged with the user emotional profile. The storing means store a self reported user feedback, user emotional profile and user snapshot at timed interval along with the said one or more content tagged with the user emotional profile.

The user emotional profile is generated based on the user specific data, content specific data and application details. The user specific data comprises one or more of the data selected from captured snapshots, emotional variation of the user and a self reporting feedback. The application details comprise number of mouse clicks, number of clicked hyperlink or scroll tab. The content specific data comprises information on media event, session data elapsed event, time stamp and metadata.

In an embodiment, the content is a video file, a webpage, a mobile application, a product review or a product demo video. The application module for the video file functions by providing access to the video file; capturing the user specific data in real time; and analyzing the user specific data to generate the user emotional profile. The application module for the webpage perform the function of accessing the webpage, capturing the user specific data in real time and the content specific data; and analyzing the user specific data and the content specific data to generate the user emotional profile. The application module for the mobile application perform the function of accessing the mobile application, capturing the user specific data in real time and the application data; and analyzing the user specific data and the application data to generate the user emotional profile. The application module perform the function of accessing the product review, capturing the user specific data in real time and the content specific data and analyzing the user specific data and the content specific data to generate the user emotional profile.

In another aspect of the present invention, a method for tagging a content is provided. The method comprises: authorizing a request coming from a user through a client device to access one or more content; capturing a user specific data in response to said one or more content; using an application module to access said one or more content, to analyze the captured user specific data and to generate a user emotional profile for a complete duration for which the user has interacted with the content; and tagging the user emotional profile with the content in a time granular manner.

The method further comprising: storing said one or more content tagged with the user emotional profile in a storing means. The storing means store a self reported user feedback, user emotional profile and user snapshot at timed interval along with the said one or more content tagged with the user emotional profile.

The user emotional profile is generated based on the user specific data, content specific data and application details. The user specific data comprises one or more of the data selected from captured snapshots, emotional variation of the user and a self reporting feedback. The application details comprise number of mouse clicks, number of clicked hyperlink or scroll tab. The content specific data comprises information on media event, session data elapsed event, time stamp and metadata.

In an embodiment, the content may be a video file, a webpage, a mobile application, a product review or a product demo video. The application module for the video file function by providing access to the video file; capturing the user specific data in real time; and analyzing the user specific data to generate the user emotional profile. The application module for the webpage perform the function of accessing the webpage, capturing the user specific data in real time and the content specific data; and analyzing the user specific data and the content specific data to generate the user emotional profile. The application module for the mobile application perform the function of accessing the mobile application, capturing the user specific data in real time and the application data; and analyzing the user specific data and the application data to generate the user emotional profile. The application module perform the function of accessing the product review, capturing the user specific data in real time and the content specific data and analyzing the user specific data and the content specific data to generate the user emotional profile.

BRIEF DESCRIPTION OF THE DRAWINGS

The invention will hereinafter be described in conjunction with the figures provided herein to further illustrate various non-limiting embodiments of the invention, wherein like designations denote like elements, and in which.

DETAILED DESCRIPTION OF INVENTION

In the following detailed description of embodiments of the invention, numerous specific details are set forth in order to provide a thorough understanding of the embodiments of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

Nowadays with the increase in use of social networking and multimedia content repository, the content is rated based on the individuals liking and disliking of the content. Typically most rating and tagging of content are limited to the option whereby user manually enters the feedback either in form of "like" or "dislike". The present invention provides a system and method that includes individual's cues, emotional scores or profiles to tag a multimedia content in a granular manner. The system combines individual cues score, emotional profile or emotional score of the user in a social networking set up to make a more powerful impact on the user's consumption habit. The present invention further extends the concept of individual cues score, Emotional Score or Emotional Profile tagging of content to a more granular level within a specific content and provides a method and a system to achieve this process in a uniform way, including ways to use such tagging for various methods of analytics and monetization models. The inclusion of individual cues scores, Emotional Scores or Emotional Profiles adds a very unique behavioral aspect to content that may then be used for searching, analytics and various kinds of monetization models for the particular content. The individual cue scores, Emotional Score or Profile is a combination of the emotion, behavior, response, attention span, gestures, hand and head movement, or other reactions or stimuli of the user collected through the sensors available in the client devices and then processed.

Figure 1:
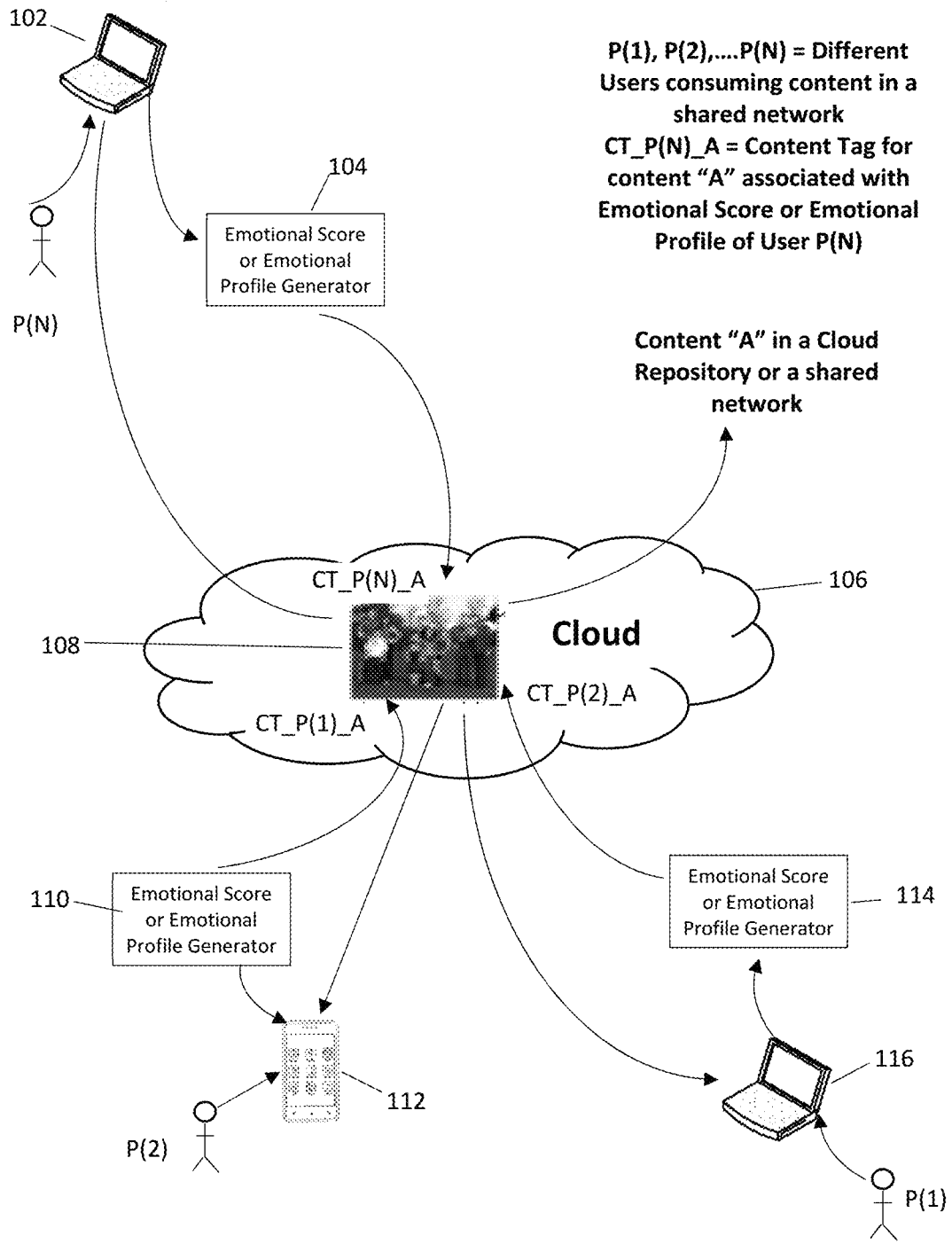
FIG. 1 illustrates a schematic representation of an embodiment of an interacting system for Emotional score or emotional profile based content tagging in connected network in accordance with an embodiment of the present invention.

FIG. 1 illustrates a schematic representation of interacting system for individual cues score, Emotional Score or Emotional Profile based content tagging in connected network in accordance with an embodiment of the present invention. The system comprises of a plurality of (P(1), P(2), . . . , P(N))connected to each other in a network through their respective client devices: client device 1 116, client device 2 112, and client device N 102. The client devices 102, 112 and 116 are configured with a server in the cloud network 106 that is having a multimedia repository containing content 108 that are accessible by the client devices of the users. The content A 108 is accessible by the different users in the network through their respective client devices 102, 112 and 116. The client devices 102, 112 and 116 have a module that has an inherent ability to continuously capture some critical auditory, visual, or sensory inputs from the individuals. This module is a functionality that may be a combination of the available sensors in the client device (camera/webcam, microphone, other sensors like tactile/haptic etc.) and the available processing modules present in the client devices. The client devices 102, 112 and 116 capture these inputs as they change in response to the individual's reaction to viewing of content A 108 that is part of connected media repository in cloud network 106. The individual cues score, emotional score or emotional profile generator 104 of client device N 102 generates the individual reaction, individual cues score, or emotional score of the user as a result of watching the content. The individual cues score, emotional score or the emotional profile of the user N associated with the content is then used to tag the content A 108 in form of CT_PN_A. Similarly the individual cues score, emotional score or reaction of the user 1 and user 2 is also generated by their respective individual cues score generator or emotional profile generator 114 and 110, and their scores are tagged to the content in form of CT_P1_A and CT_P2_A. As a result of this the content A 108 that has been watched by n number of users, and the individual reaction, individual cues score, or the emotional score (CT_P(1) A), CT_P(2) A, . . . , CT_P(3) A) of each user as a result of watching the content is tagged to the content A 108. The individual cues score or the emotional score tagged to the content is then stored in the cloud network as an update on the individual cues profile or the Emotional Profiles of the users P(1), P(2), . . . P(N). Alternatively, the client devices need not generate and send individual reaction, individual cues score, or the emotional score to the cloud or server, and may instead transmit data (e.g. auditory, visual, or sensory inputs from the individuals) to one or more servers which process said data to create the individual cues score or the emotional score and update the individual cues profile.

In an embodiment of the present invention, the content A 108 tagged by the individual cues scores, Emotional Scores, or Emotional Profiles of a number of users may be used in multiple ways to increase the relevance of the content on an application specific, user specific, or delivery specific contexts.

In an embodiment of the present invention the client device 102 comprises of a single module or a plurality of modules to capture the input data from the individual, to process the input data for feature extraction and a decision phase for generating the profile of the user. Some examples of these input modules may be webcams, voice recorders, tactile sensors, haptic sensors, and any other kinds of sensory modules.

In another embodiment of the present invention, the client devices 102, 112 and 116 include but is not limited to being a mobile phone, a Smartphone, a laptop, a camera with WiFi connectivity, a desktop, tablets (iPAD or iPAD like devices), connected desktops or other sensory devices with connectivity.

In another embodiment of the present invention, the individual cues score, emotional profile or emotional score corresponds to the emotion, behavior, response, attention span, gestures, hand and head movement, or other reactions or stimuli of the user.

Figure 2:
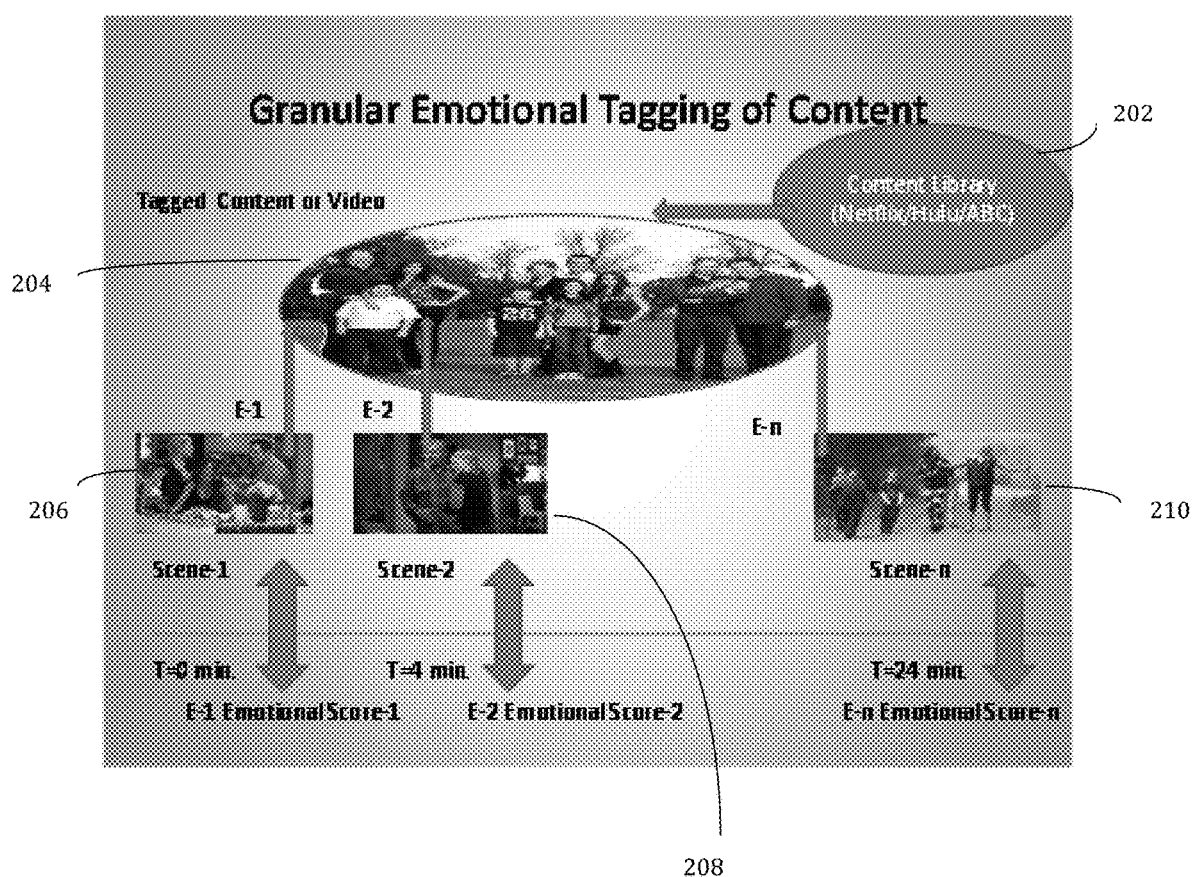
FIG. 2 shows an exemplary illustration of granular tagging of multimedia content in accordance with an embodiment of the present invention.

FIG. 2 shows an exemplary illustration of granular tagging of multimedia content in accordance with an embodiment of the present invention. The example illustrates a method that enables more granular tagging of a multimedia content by the different users. The example shows an episode of a TV show 204 that is 24 minute long that has to be tagged with the emotional score in a granular manner. The episode of TV show 204 is a part of content library 202 or connected repository. The users connected in the network have an access to the content library 202 through their respective client devices, and the content library 202 consists of various channels such as Netflix/Hulu/ABC that provides a link to various multimedia contents available online. When the user watches this multimedia content, the system tags the content by his reaction or emotional score at regular intervals. The example shows a TV show 204 that has to be tagged based on emotional score in a granular manner. While the TV show 204 is being watched by the user, the content is being tagged with the emotional score of the user watching the TV show 204 in a continuous manner. The TV show 204 is divided into number of time segments, for instance scene 1 206 is for time t=0. The emotional score of the user associated with scene 1 is E1. Similarly scene 2 208 is for time interval t=4 min and the emotional score associated with that particular time is E2. Thus, the tagging of the TV show 204 results in a number of tags that are associated with the exact time stamp of a particular segment. At the end of the tagging the TV show 204 now has several reactions or Emotional Score tags that are associated with specific time segments of the show.

In an embodiment of the present invention, the content 204 to be emotionally tagged is divided into a number of time segments, the segments being equally spaced. When the content 204 is tagged by the emotional score of a large number of users, the average emotional score for a particular time segment of the content 204 may be created. This in turn provides a unique way to classify different part of a TV show with very useful information about the user's reactions or Emotional Score tagged with respect to time segment of the TV show. In another embodiment of the present invention the tags may be individual cues of specific users that may include attention span, gestures, head and hand movements and other sensory inputs given by the users while watching a specific content.

Figure 3:
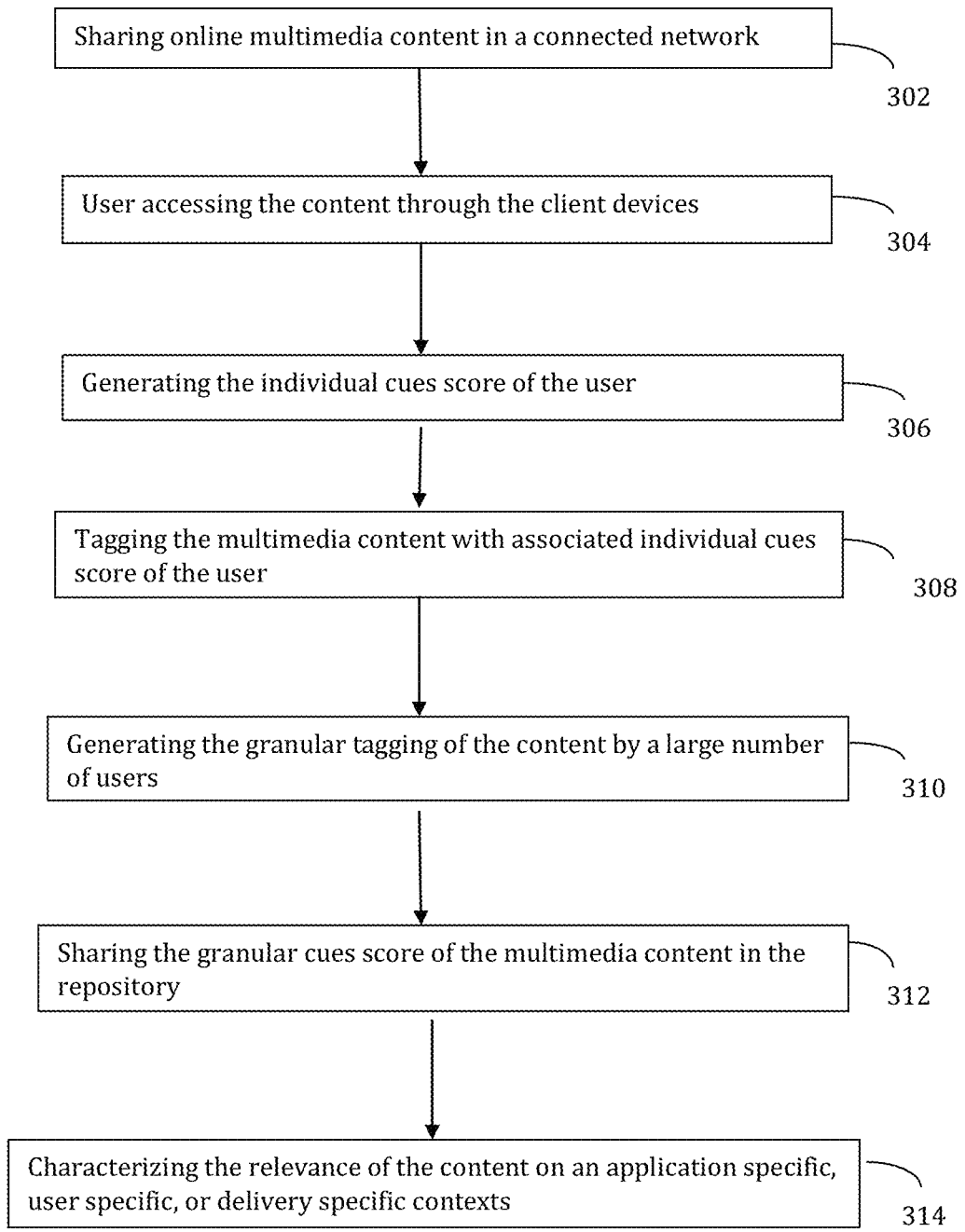
FIG. 3 illustrates a flow diagram depicting the method for tagging the content in a granular manner in accordance with an embodiment of the present invention.

FIG. 3 illustrates a flow diagram depicting the method for tagging the content in a granular manner in accordance with an embodiment of the present invention. In an embodiment, the method include following steps: Step 302: The online media content is stored in multimedia repository which is connected to the server in the cloud network. The multimedia repository being configured to the server has an ability to share the content in the networked environment. Step 304: The plurality of users are connected in the network with each other and to the multimedia repository, and thus have an access to the content in the repository. Step 306: When the user accesses the media content, the user express their feelings in form of individual cues or emotions. These individual cues or emotions are captured by the module present in client devices that generates the individual cues score, emotional score or emotional profile of the user associated with the content being viewed by the user. Step 308: the generated individual cues score, emotional score or emotional profile of the user is tagged to the content. The individual cues score, emotional profile or emotional scores are generated in a continuous manner, and for a particular segment of the content, the score corresponding to that segment is tagged. This results in granular individual cues or emotion based tagging of the video content. Step 310: The granular tagging of the content is done by specifically tagging the individual cues score or emotional score of the user with respect to the content being watched. Thus, the content is tagged with the individual cues score or emotional score of a large number of users. Step 312: After generating the individual cues score or emotional score of the user associated with the media content, the granular individual cues or emotional tagging of the content is shared in the central repository. Thus, the content is having a tag from a large number of users who have watched the content. Step 314: The granular individual cues score or emotional score of the content is then used to characterize the media content.

In an embodiment of the present invention, the tagged information may be used in multiple ways to increase the relevance of the content on an application specific, user specific, or delivery specific contexts.

Figure 4:
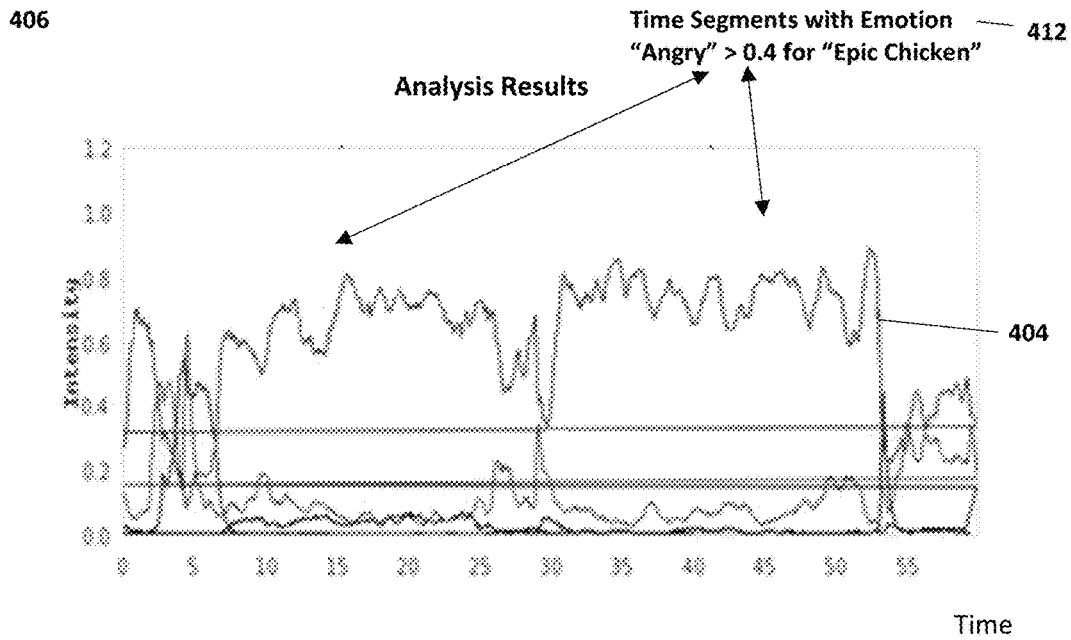
FIG. 4 illustrates a user interface showing the concept of granular emotion based tagging of multimedia content in accordance with an embodiment of the present invention.

FIG. 4 illustrates a user interface showing the concept of granular individual cues or emotion based tagging of multimedia content in accordance with an embodiment of the present invention. The interface 402 shows an output of the module that detects instantaneous reaction, individual cues score, or Emotional Score in a system of the invention. The interface 402 comprises of various regions that shows the outcome of the granular individual cues or emotional tagging of the multimedia content. The region 406 provides the details of video content that has been viewed by the user and is tagged thereafter. The region 406 provides the content details along with metadata that links the content to its source, and the rating given by the user with its intensity and the rating detected by the system through its module. The interface 402 shows the output to the Emotional Score generator module for a specific content ("Epic Chicken Burger Combo" (a YouTube video)). The user's reaction on watching this video is generated by the Emotion Detection module 104. The reaction may be based on a variety of sensors (webcam, voice recording, tactile or haptic sensors, or other sensory modules). The instantaneous Emotional Score of the user is generated as a function of time as shown in region 404. The time axis is synchronized with the time stamps of the content ("Epic Chicken Burger Combo"). The instantaneous score is the normalized Emotion displayed by the user and may have a number of different emotions at any given instance. The graph in the region 404 provides the users emotional score while viewing the content in a continuous granular manner with respect to different time segments. The interface 402 further comprises of a region 408 that provides a D-graph displaying the average value of the emotional score of content 406 and a region 410 that displays a D-graph showing the peak values for the emotional score that has been generated while the user had watched the content 406.

In an embodiment of the present invention, the intensity of the detected emotions vary from the range of 0 to 1 and the different types of emotions used to predict the behavior of the user may be one of 7. The detected emotional state includes Happy, Surprised, Fearful, Normal, Angry, Disgusted, and Sad.

In another embodiment or application, the different emotions may be a smaller subset and may have scores in a different scale. This provides a method of tagging the content with an instantaneous Emotional Score based on a specific user's reaction and at a specific time stamp of the content. Thus, a uniform way of continuous and granular Emotional tagging of any content may be done. In another embodiment of the present invention, the tags may be individual cues scores instead of Emotional Scores. These individual cues scores may include attention span, gestures, head and hand movements and other sensory inputs given by the users while watching a specific content In another embodiment of the present invention, the granular tagging of a variety of content may be done by a large number of users. The granular emotional tagging may then be used to provide a characteristic feature to large multimedia repositories that may further be used in multiple ways to characterize the content in a very granular manner.

Once, there is a uniform method of granular tagging of a content repository as described above, there are numerous applications of using the content tagged in the above fashion. Some of these applications are described below, and other related applications are readily apparent to the person skilled in the art based on the ideas described herein.

In an exemplary embodiment of the present invention, the granular emotional tagging of the multimedia content is used to identify the segment which is of concern to the users. The graph of emotional score with respect to time 404 on the reaction of content 406 being watched is used to identify the time segment of interest to the users. For instance, the different time segments of the content 306 are analyzed to find out the scene of interest, based on a query that asks to identify the segments of the video that have displayed the Emotion "Anger">0.4. This brings out the two identified segments as shown in region 412. These kinds of queries may be generalized over a whole set of videos comprising a content repository like Netflix, or YouTube videos.

In another embodiment of the present invention, the system of the present invention is used to identify specific segments of videos that have displayed the highest time averaged specific Emotion (say, "Happy"), or specific segments from a repository that have scored (averaged over all users) a score of "Surprised>0.6"

The method of the present invention may be used to create Movie Trailers for audience based on some initial feedback from a focus group. The system may be used to pick a given set of segments with the same video of content that have scored, say "Happy>0.5", averaged over all users, or all users in a specific age demography. The selected particular segment may be used for creating a movie trailer.

In an embodiment of the present invention, a method for analyzing a context or an event is provided. This analysis results into a system generated feedback report which include amongst others: user's emotion reactions to the context or event, user emotional profile, emotion vector etc. The user's emotions while interacting with the context or event is captured in form of user's sensory or behavioral inputs. While interacting with the context or event, the users leave their emotional traces in form of facial or verbal or other sensory cues. The client device captures various sensory and behavioral cues of the user in response to the context or event or the interaction.

The captured sensory and behavioral cues are mapped into several "Intermediate states". In one of the embodiments of the invention these "Intermediate states" may be related to instantaneous behavioral reaction of the user while interacting with the "Event". The intermediate states mark an emotional footprint of users covering Happy, Sad, Disgusted, Fearful, Angry, Surprised, Neutral and other known human behavioral reactions. The behavioral classification engine assigns a numerical score to each of the intermediate states that designate the intensity of a corresponding emotion. The system also optionally applies a second level of processing that combines the time-aligned sensory data captured, along with the "Intermediate states" detected for any sensors as described in the previous step, in a way to derive a consistent and robust prediction of user's "Final state" in a time continuous manner. This determination of "Final state" from the sensory data captured and the "Intermediate states" is based on a sequence of steps and mapping applied on this initial data (sensory data captured and the "Intermediate states"). This sequence of steps and mapping applied on the initial data (sensory data and the "Intermediate states") may vary depending on the "Event" or the overall context or the use case or the application. The Final state denotes the overall impact of the digital content or event on the user and is expressed in form of final emotional state of the user. This final state may be different based on different kinds of analysis applied to the captured data depending on the "Event", the context, or the application.

The final emotional state of the user is derived by processing intermediate states and their numerical scores. One way of arriving at the Final State may be done in the following way. For each time interval (or the captured video frame) each Intermediate State data goes through a statistical operation based on the instantaneous value of that Intermediate State and its average across the whole video capture of the user in reaction to the Event.

Figure 5:
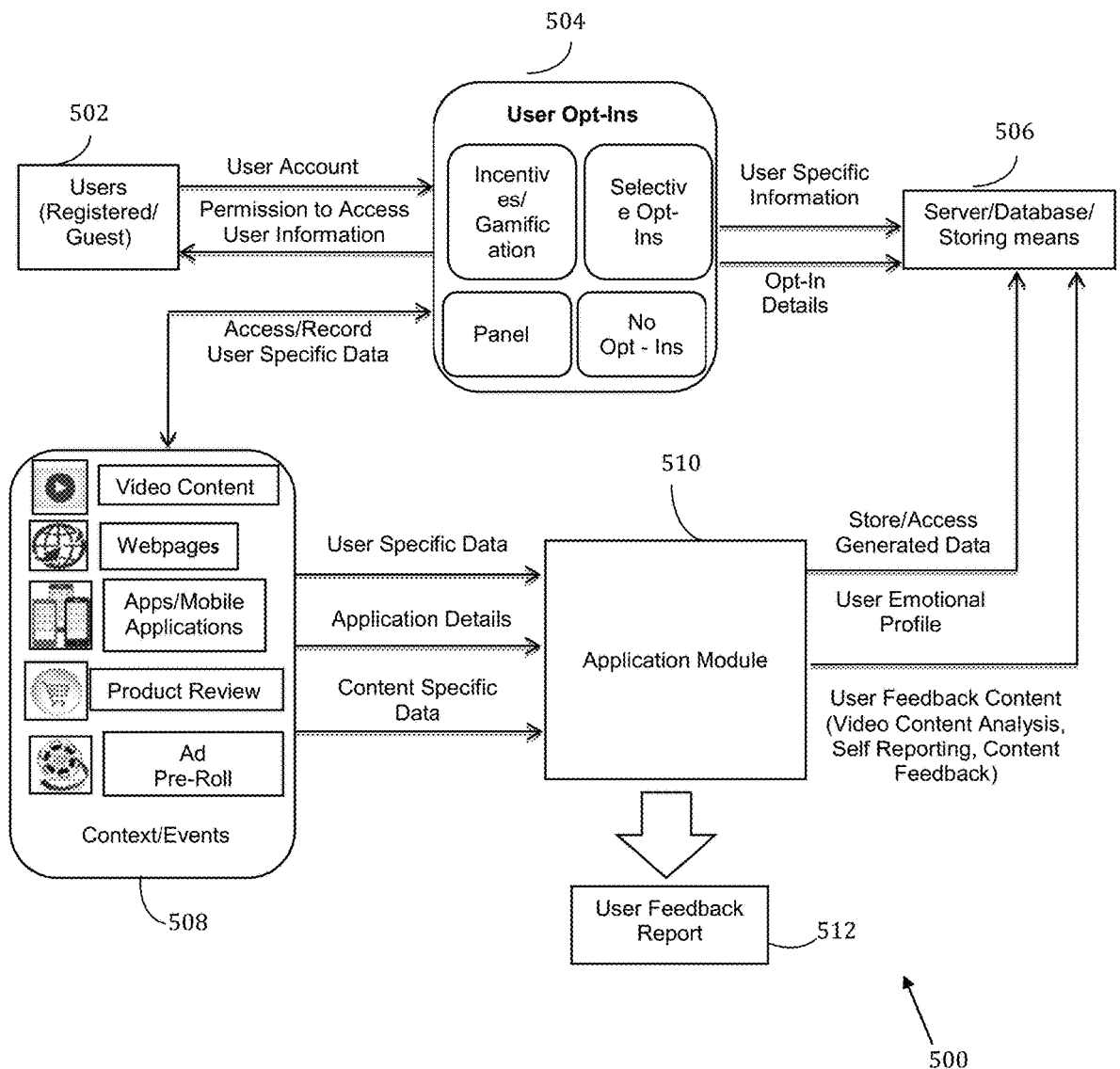
FIG. 5 illustrates a system for tagging context or event, in accordance with an embodiment of the present invention.

FIG. 5 illustrates a system 500 for tagging one or more context or event 508, in accordance with an embodiment of the present invention. An account is created by a user 502 by registering in the system using a client device, wherein an authorizing module 504 is configured to authorize a request coming from the user 502 to access the one or more context or event 508, where the one or more context or event 508 is a video file, a webpage, a mobile application, a product review or a product demo video. Once the user 502 registers himself, the user 502 can access the one or more context or event 508. The authorizing means 504 further comprises a user opt-in where user has the option to opt-in for incentive or gamification or other selective options or a panel or can access the one or more context or event 508 directly without selecting any opt-ins. Based on the level of opt-in the user has chosen, different levels of information will be captured and analyzed. For example, if the user chooses to be in a paid Panel, then all users video captured could be stored in the Server/Database storing means 506 in the subsequent steps and used for analysis purposes. If the user chooses Incentives and Gamification option then also user videos could be stored and analyzed. If the user choosed Selective Opt-in, the user may choose not to have his video stored, but the analytics based on user video captured could still be used. If the user chooses No-Opt in then no user video information would be used, user may still give some self reported feedback to the system. These various User Opt-in options could change and mean different things in various embodiments of the system. After registration, when the user 502 interacts with the one or more context/event 508, the user specific data, application details and content specific data is captured and stored in a storing means or a database or a server 506. The user specific data comprises captured snapshots, emotional variation of the user 502 and a self-reporting feedback with respect to the one or more context or event. The application details includes number of mouse clicks, number of clicked hyperlink or scroll tab and the content specific data comprises information on media event, session data elapsed event, time stamp and metadata.

The system 500 also comprises an application module and a processing means. The application module 510 accesses the one or more context or event 508 and analyzes the captured user specific data, application details and content specific data to generate a user feedback result 512 for a complete duration for which the user has interacted with the context or event 508. The processing means tags the user feedback result 512 with the context or event 508 in a time granular manner.

In an exemplary embodiment, said one or more context or event 508 may be a video file. The application module 510 accesses the video file, and captures the user specific data in real time while the user is viewing the video file. The captured user specific data is then analyzed to generate the user emotional profile or a feedback report. The user emotional profile is generated based on captured video, audio, and other user specific information from the user. The user is also provided with option to give their feedback. The user profile and the context information is then sent to the storing means or the database or the server. The user emotional profile and the feedback report generated by the system is also stored in the storing means. The storing means or the database or the server also include information on the session information and the user specific information. The session information includes media events, elapsed events, emotion vectors, time stamps. The user specific information includes user data, event data, timestamp data, metadata and user emotional profile data.

In another exemplary embodiment, the one or more context is a webpage. The application module allows the user to access the webpage. Thereafter, it monitors the user reactions and captures the session information. The captured user reactions and the session information is then analyzed along with the session details to generate a feedback report. The user emotional profile is generated based on captured video, audio, and other user specific information from the user. The application module then transfers the session information along with the user emotional profile and self reporting feedback together with the system generated feedback report to the storing means or server or the database. The session information includes information pertaining to an event, mouse clicks, hyperlinks on the webpage and time stamp data. The user specific information for webpage includes user emotional profile, time stamp and metadata.

In another exemplary embodiment of the present invention, the one or more context or the event is a mobile application. The application module configured for the mobile application data performs the function of accessing the mobile application and captures and records the user specific data and application specific data in real time to analyze the user specific data and the application data to generate user feedback result. The user emotional profile is generated based on captured video, audio, and other user specific information from the user. The application module transfers the context/application profile data in the form of mobile application generated data, user emotional profile, self reporting feedback report and the system generated feedback result to the server or the storing means or the database. The context/application profile data includes the user information, event, application information and timestamp data. The user specific information includes user emotional profile, emotional vector, timestamp and metadata.

In another exemplary embodiment of the present invention, the one or more content is a product review or a product demo video. The application module first accesses the product review or the product demo content. The application module monitors or captures the review session, the user reactions captured with video and/or audio, and analyzes the review session data to generate the system feedback report. The user emotional profile is generated based on captured video, audio, and other user specific information from the user. The application module then transfers the product information, user specific information, self reported feedback report and system generated feedback result to the storing means or the database or the server. The product information includes product review profile such as user information, event data, review data and timestamp data. The user specific information includes user emotional profile, emotion, time stamp and metadata.

Figure 6:
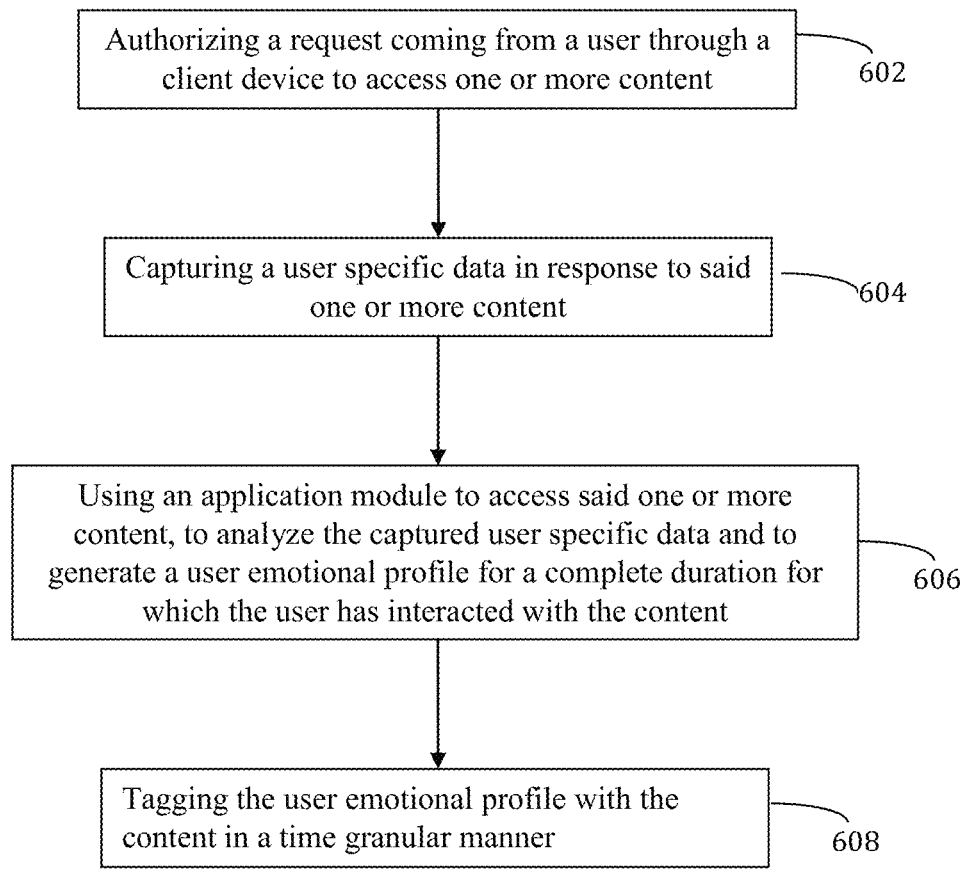
FIG. 6 shows a block diagram illustrating the method for tagging context or event, in accordance with an embodiment of the present invention.

FIG. 6 shows a block diagram illustrating the method for tagging context or event, in accordance with an embodiment of the present invention. The method of tagging includes the steps of authorization, data capturing, analysis of the captured data and profile generation. A user registers himself or herself to interact with one or more online content, wherein the one or more online content is a video file, a webpage, a mobile application and a product review or a product demo video. At step 602, a request coming from the user through a client device to access one or more online content is being authorized at the backend. After authorization, user can access the one or more online content. When the user interacts with the one or more online content, his/her user specific data (that would include user's video and audio reaction and any other captured inputs through other sensory inputs like gestures, haptic or tactile feedback), application details and content specific data is captured accordingly at step 604. In the present invention, the user specific data is the data selected from captured snapshots, audio and video inputs, emotional variation of the user and a self-reporting feedback, the application details are number of mouse clicks, number of clicked hyperlink or scroll tab and the content specific data is information on media event, session data elapsed event, time stamp and other media event related metadata such as rewind, fast forward, pause etc. In the step 606, an application module accesses the one or more online content, to further analyze the captured user specific data, the application details and the content specific data and thereby generates a user emotional profile for a complete duration for which the user has interacted with the content. The user emotional profile is generated based on captured video, audio, and other user specific information from the user. After generation of the user emotional profile, tagging of the user emotional profile is done with the one or more online content in a time granular manner at the step 608.

Figure 7A:
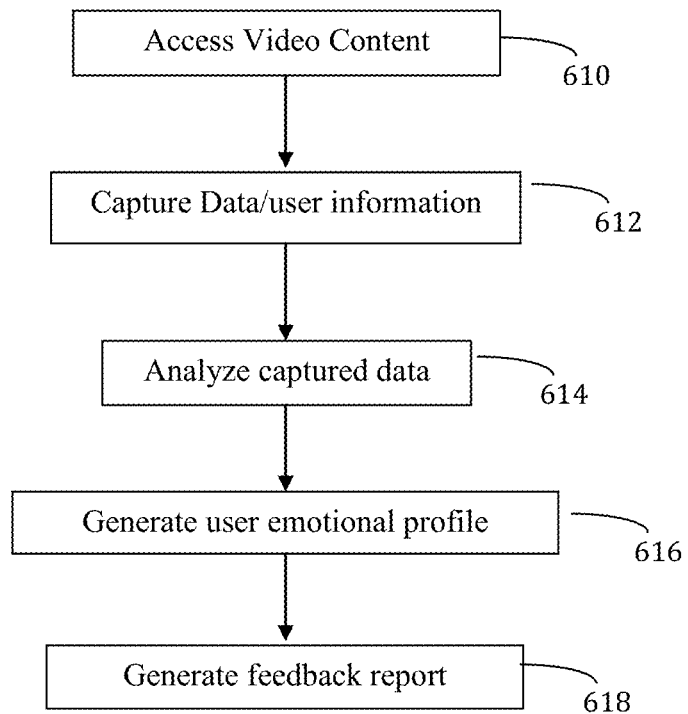
FIG. 7A shows a block diagram illustrating the method used by an application module for tagging a video file, in accordance with an exemplary embodiment of the present invention.

FIG. 7A shows a block diagram illustrating the method used by an application module for tagging a video file, in accordance with an exemplary embodiment of the present invention. The application module generates a feedback report for the video file. The feedback report is generated by a method comprising: At step 610, the application module accesses the video content. Proceeding at step 612, capturing the user specific data in real time followed by step 614: analyzing the user specific data. At step 616, user emotional profile is generated and at step 618: the feedback report is generated for the video file.

Figure 7B:
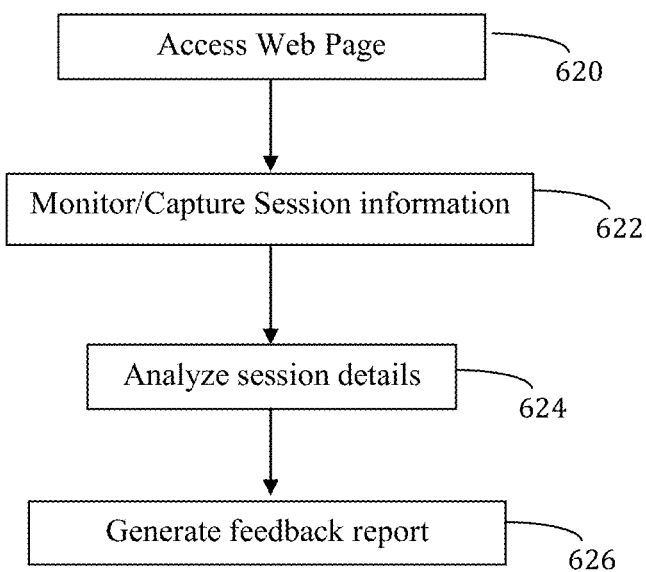
FIG. 7B shows a block diagram illustrating the method used by an application module for tagging a web page, in accordance with an exemplary embodiment of the present invention.

FIG. 7B shows a block diagram illustrating the method used by an application module for tagging a web page, in accordance with an exemplary embodiment of the present invention. The application module generates a feedback report for the webpage by following a method, the method comprising: At step 620 accessing the webpage, followed by step 622 of capturing the user specific data and content specific data in real time and then at step 624 analyzing the user specific data and the content specific data. At step 626, the application module generated the feedback report for the webpage.

Figure 7C:
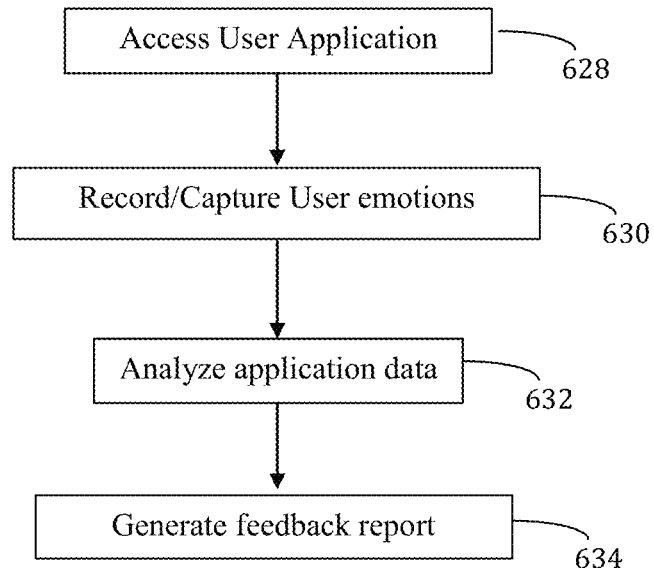
FIG. 7C shows a block diagram illustrating the method used by an application module for tagging a mobile application, in accordance with an exemplary embodiment of the present invention.

FIG. 7C shows a block diagram illustrating the method used by an application module for tagging a mobile application, in accordance with an exemplary embodiment of the present invention. A feedback report is generated by the application module by following: At step 628, the user first accesses the mobile application using the application module. During the interaction his/her user specific data and application details are captured in real time at step 630. After this, the user specific data and the application details are analyzed at step 632 to generate the user emotional profile at step 634.

Figure 7D:
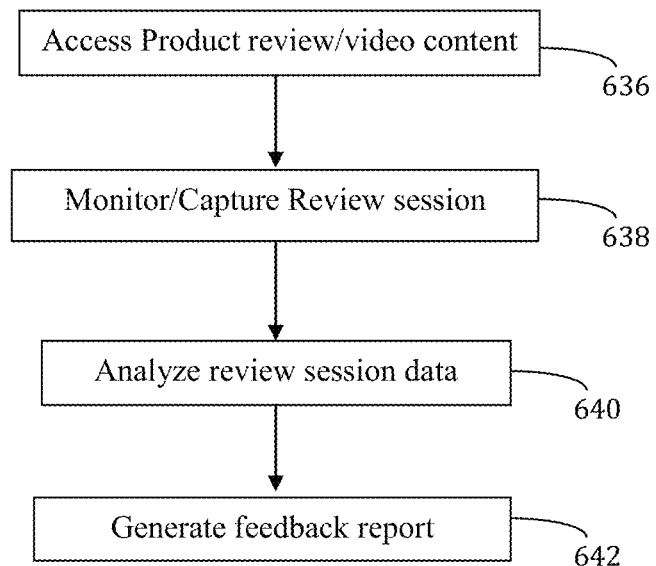
FIG. 7D shows a block diagram illustrating the method used by an application module for tagging a product review or a product demo video, in accordance with an exemplary embodiment of the present invention.

FIG. 7D shows a block diagram illustrating the method used by an application module for tagging a product review or a product demo video, in accordance with an exemplary embodiment of the present invention. The application module generates a feedback report for the product review or demo video by following the method comprising: At step 636 the application module accesses the product review, and captures the user specific data and the content specific data in real time at step 638. The application module, analyzes the user specific data and the content specific data in step 640 and the application module generates the feedback report at step 642.

In one of the embodiments of the present invention, the present invention provides a unique method and a system for media content analysis based on pushing target content to a defined set of participants capturing participant's real time reactions in form of non-verbal cues and participant's facial expressions as the participant watch the content. The method and the system is related to identifying the most engaging short segments within a large digital content based on real time emotion and reaction data gathered at scale. The components of system are described in FIG. 1, in which the system comprises a server module from which a given digital content that is being tested is streamed to a large set of participants or users. A content owner can upload a media content in the server for which the content analysis is required.

The system is accessible by the content owner and the participants who wish to take part in the content analysis using a web-page or a web-based application. The web-page or the web-based application is provided with features such as secure log-in, personalized profile etc. along with other features.

The participants can use a web-based browser or a smartphone based application to stream the video contents from server. The system has ability to micro-target demographics based on the digital content that is being tested. The ability to micro-target demographics is an important one since this gives the content owner a way to gather relevance of the content based on different kind of audience. The participants who are sent this content "opt-in" to watch this content in a device of their choice. This device could be any device with connectivity that is able to receive the content link via an e-mail or a link sent through internet or over a mobile device. This device could be any of the following: a laptop or desktop with camera or audio capture capability, a smartphone with display and video and audio capture capability or any such internet enabled device. Once the user "opt" in, the user is told that his or her camera would be turned on and her emotions and/or reactions would be captured as they are watching the content. The same content is pushed to a large number of users and their emotions and/or reactions are captured at scale.

The present invention comprises a unique media content evaluation method based on combining multi-modal inputs from the audiences that may include reactions and emotions that are recorded in real-time on a frame-by-frame basis as the participants are watching digital content. The system pushes the same content to a different set of users. For one set of users, the users will only be asked to watch the content as they system records and analyzes their facial expressions to gather their frame by frame emotional reaction. For another set of users the users are explicitly asked to react via customized Emojis on a frame by frame basis to indicate what they feel like reacting in a granular manner as the content is being watched. In one embodiment of this invention these Emojis could be (Like, Dislike, Love, Want, and Memorable). The user could click and one of them at any specific frame while watching the content. Sometimes, the same set of users may be asked to click the Emojis and their emotional behavior would also be tracked on a frame by frame basis.

System Architecture

FIG. 1 illustrates a schematic architecture of the system used for identifying the segments of interest within a large digital content based on real time emotion and reaction data gathered at scale. The system comprises a server module or cloud 106 from which a given digital content that is being tested is streamed to a large set of people. There are two type of users (102, 104, 106) in the system: first type is of content owner who posts their media or digital content in the server 106 for which the analysis is requires and other type of users are participants in the survey whose facial expression or reactions are captured to analyze the video content. The content owner and the participants can access the server module or cloud 106 using a web-page or a web based application. The content owner and the participants can register themselves to utilize the service of the web-page or web based application. On registration a profile page may be generated for the content owner and the participants.

The content owner can upload their media content or digital content in the server using the web-page or web-based application. The media content or the digital content then get stored in the repository or database in the server.

The media content in the server can be viewed by the participants using a web-enabled device which can be used to stream the media content from server using Internet. The web-enabled device 102 includes but is not limited to being a mobile phone, a smartphone, a laptop, a camera with Wi-Fi connectivity, a desktop, tablets (iPad or iPad like devices), connected desktops or other sensory devices with network connectivity and processor capability. The web-enabled device may comprise a camera which is used to capture the facial expression of the participants while the participant is watching the media content. The facial expressions are captured in form of video data in time granular manner. The server in the cloud 118 has the ability to interact with the web-enable devices 102, 114 and 116 in a real time manner, such that the facial expressions of the participants are captured in real-time. The web-enabled device may also comprise other input means which can be used to capture other non-verbal cues of the user, such as audio-text conversion, gesture, eye movement tracking, head movement tracking and possible feedbacks from other sensory inputs that can capture haptic, tactic feedback that could relate to participant engagement or disengagement with the media content. The captured facial expression and reactions in form of non-verbal cues are then processed at server end for analyzing the content.

Figures 8, 9:
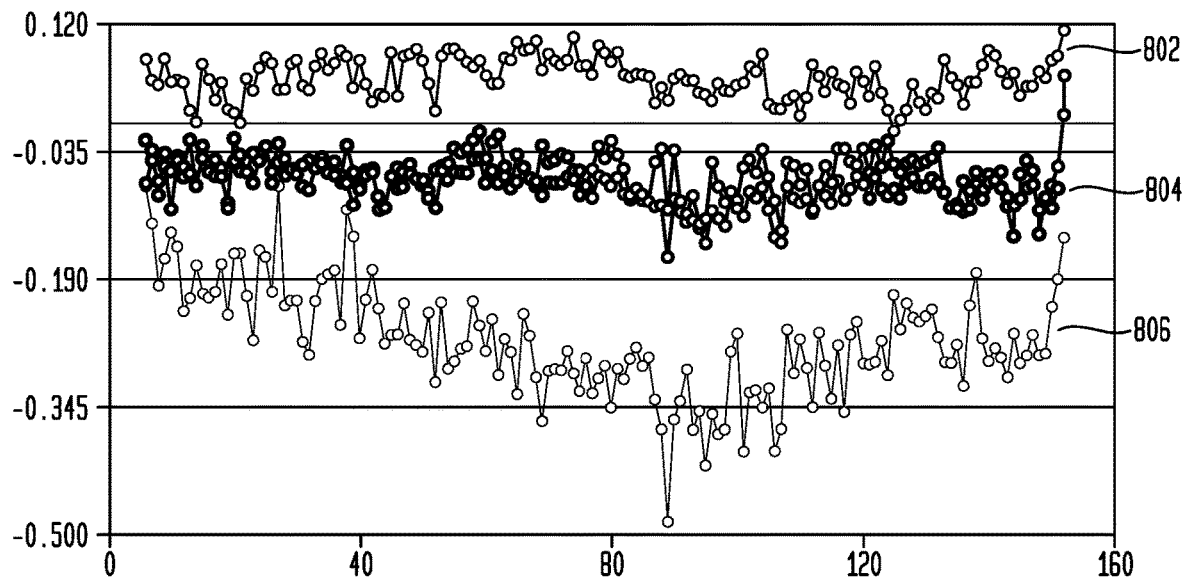
FIG. 8 shows a dashboard on the web-page of a service provider in accordance with an exemplary embodiment of the present invention.
FIG. 9 shows different levels or cohorts of participants in accordance with an exemplary embodiment of the present invention.

FIG. 8 shows a dashboard on the web-page of service provider for creating campaign by a content owner to create a campaign for capturing facial expressions of a group of participants in accordance with an embodiment of the present invention. The campaign owner can specify details such as campaign name, description of the campaign, campaign type (video, audio etc.), campaign URL, start date, end date etc. The content owner can determine which emotional evaluation he wants for analyzing the media content. The content owner can select the box 702 for analyzing media content in term of facial expression, and can select box 704 for capturing user reaction in term of non-verbal cues. In the given example of FIG. 7, the various facial expressions that are being used for analyzing the media content are Joy, Sad, Surprised, Neutral, Disgusted, Fear and Angry. And the various reactions studied for the participants are Dislike, Love, Want, Love and Memorable.

In an embodiment of the present invention, while creating a campaign, the content owner can specify one or more questions that need to be answered by the participants for analyzing the engagement of the participant with the media content.

In another embodiments, the content owner can specify the attributes that should be met by the participants for participating in the content analysis. The attributes that can be specified by the content owner may include age, religion, geographical distribution, gender, ethnicity etc.

In an embodiment, the present invention provides a method for evaluating media content based on combining multi-modal inputs from the participants that include reactions and emotions (captured in form of facial expression) that are recorded in real-time on a frame-by-frame basis. The real time reactions and emotions may be recorded in two different steps or campaigns (with two different sets of people), and which include different participants for each.

In an exemplary embodiment of the present invention, the facial expression and reactions are captured for two different set of participants: for the first set of participants, the participants emotions are captured and analyzed in term of Facial expression detection and physiological response analysis; and for the second set of participants, their captured reactions are analyzed in term of real-time reaction detection and reaction analysis.

Facial Expressions detection and Physiological Responses Analysis

When a campaign is launched by the content owner, the participants are informed about the campaign through various notifications, such as email, sms or other means. Only those participants are informed which matches with the attributes specified by the content owner for a particular media content. When the participants watch the media content on the web-page of the service provider, which is being streamed from the server, they are video-recorded and audio-recorded and their on-going emotions while watching the content are being recorded. When the media content is being displayed at the web-enabled device of the participants, the facial expression of the participants are continuously recorded by the web-enabled device which is being continuously transmitted to the server through internet. The server comprises a processor, an application program and a facial pattern determination engine that segments on a per frame basis, the reaction of individual participants into multitude of probability of macro facial expressions as well as the intensity of emotions displayed at each frame.

The server processed the video-recording of the individual participants and extracts a set of physiological response measurements such as Arousal, which is a measure of intensity of engagement. The facial pattern determination engine studies the facial pattern of the participant in frame by frame manner to classify the facial expression of users into one or more emotional states. The one or more emotional state may comprise Angry, Disgust, Fear, Joy, Neutral, Sad and Surprise among others. The emotional states are categorized into positive and negative emotional states. The facial pattern determination engine also determines the value of different emotional states in a frame by frame manner, wherein the value of the emotional state signifies its corresponding intensity.

In an illustrative example, the positive emotional states include Joy and Surprise, whereas the negative emotional states include Angry, disgust, neutral, sad and Fear. At the server, valence is determined by subtracting the maximum of negative emotions value from the maximum of positive emotions value. Valence is an indirect indicator of the effectiveness of the media content. If the valence is positive, then the corresponding frame is positive and when the valence is negative, it signifies the frame is negative.

Figure 10:
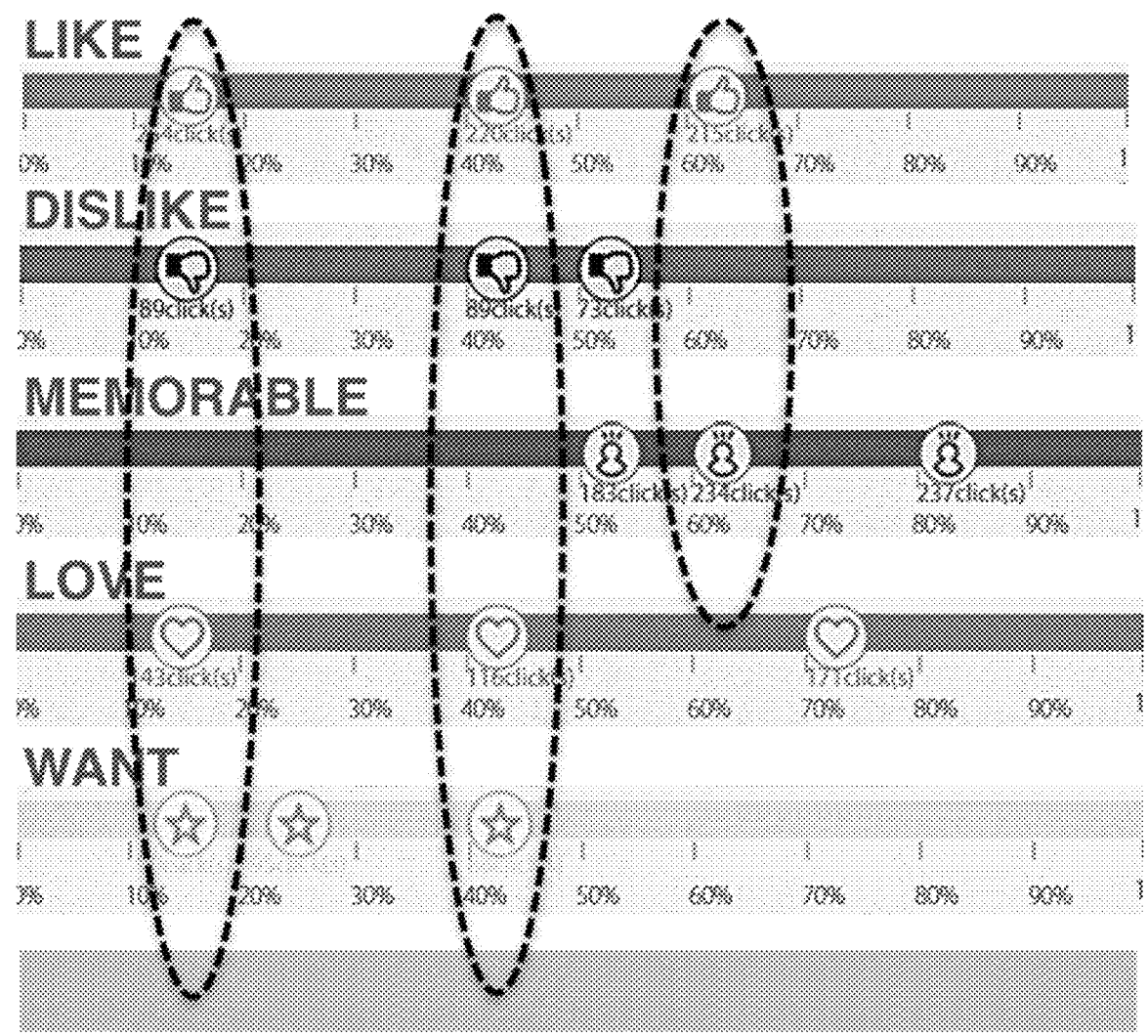
FIG. 10 shows a plot of reactions captured for second set of participants in accordance with an exemplary embodiment of the present invention.

The processor in the server process the determined emotional states, their value and valence for each participants in the first set of participants, to identify three different groups or cohorts of participants in that set. These three different cohorts of participants are determined with three absolute level of valence. These levels are: "high", "mid" and "low". In order to identify the participants that are included in each of the levels or cohorts, the standard deviation of the sample is calculated, and, proportional to the total number of the participants, a percentage of the standard deviation is taken. "High" cohort contains the participants that are above the chosen percentage of the standard deviation, "mid" cohort contains the participants between the upper and lower the chosen percentages of the standard deviation, and "low" cohort contains the participants that are under the chosen percentage of the standard deviation. Averages of the total number of participants are calculated for each second of the video and for each cohort. FIG. 10 shows different level or cohorts of participants. The top cluster 802 signifies the cohort of participant which are in high level. The middle cluster 804 are the cohort of participants at mid-level, whereas the bottom cluster 806 denotes the cohort of participants with low level of valence. The mid-level are the cohort of participants that have average level of valence. The high level 804 are the set of users who have valence one standard deviation above the overall average (these are the more positively emoting set or cohort), and the low-level cohorts are the one that depicts the overall valence of the set of participants who have valence one standard deviation below the overall average (the lowly emoting set or cohort). The peaks and valleys of these three graphs are calculated to infer the most positively reacting regions of the content. In one embodiment of the invention wherever the peaks of the valence graph of the more positively emoting cohort coincide with the peaks of the valence graph of overall people, these frames are identified as candidates for peaks in emotional reaction.

In FIG. 9, the calculated averages over time are plotted for all three cohort of participants into a 2d scatter representation. The points' connecting lines and a customized trend line are plotted as well. From the plotted lines three main indicators can be read: 1) Slope trends: increase, decrease and sustained areas, 2) Magnitude trends: high and low areas, and 3) Peaks: high and low punctual and absolute maximums and minimums. The combination of the tree indicators points to fragments of the video content that may be eager to trigger several physiological responses. This video fragments, are potential candidates to be the top maximum and minimum video scenes or video frames in terms of physiological responses: engagement detection and emotional detection.

Real-Time Reactions Detection and Reaction Analysis (Video Content)

Similar to the first set of participants, when a campaign is launched by a content owner, the second set of participants are informed through notification that the campaign is launched. The notification is similar to the one which is used for the first set of participants. In order to easily provide the feedback while the video content is displayed, the participants are presented with a set of emoji's that represent real-time emotional reactions. In one embodiment of the invention the default emojis are Like, Dislike, Love, Memorable, and Want. The set of emojis are personalized depending of the nature of the content and the content producer's objectives of the campaign. When video content is displayed, the system records each of the participants' clicks on the emojis noting the exact time instance of the content timeline where the clicks were done.

For the second set of participants who were sent the content for capturing frame by frame Emoji reactions, the overall frequency on a per frame basis is calculated for the whole sample. In one embodiment of the invention the frequency of each Emoji is calculated for the whole sample in a time interval of 4 sec. This time interval could be changed.

In an embodiment, when all the Emoji frequencies are calculated, the top three peaks for the entire content are plotted as a function of time length of the digital content. The peaks of these Emojis is observed for the full length of the content. In one embodiment of the invention the points in the content timeline are identified where multiple positive peaks of different Emojis match. For example, if there is a point where one of the top 3 peaks of Like matches with one of the top 3 peaks of Love &/or Memorable, this point is identified as one of the candidates of relevance for the overall audience.

From the real time reactions recorded while watching the video, each reaction type is clustered in the tree clusters of highest frequency of appearance along the video duration. The number of clicks that sum up for each cluster is calculated, and resulting clusters are plotted in a horizontal time line corresponding to the duration of the video campaign. FIG. 10 shows a plot of reaction captured for second set of participants. The plot shows three clusters which indicate the fragments of the video content that are more eager to trigger the clicked reaction.

Figure 11:
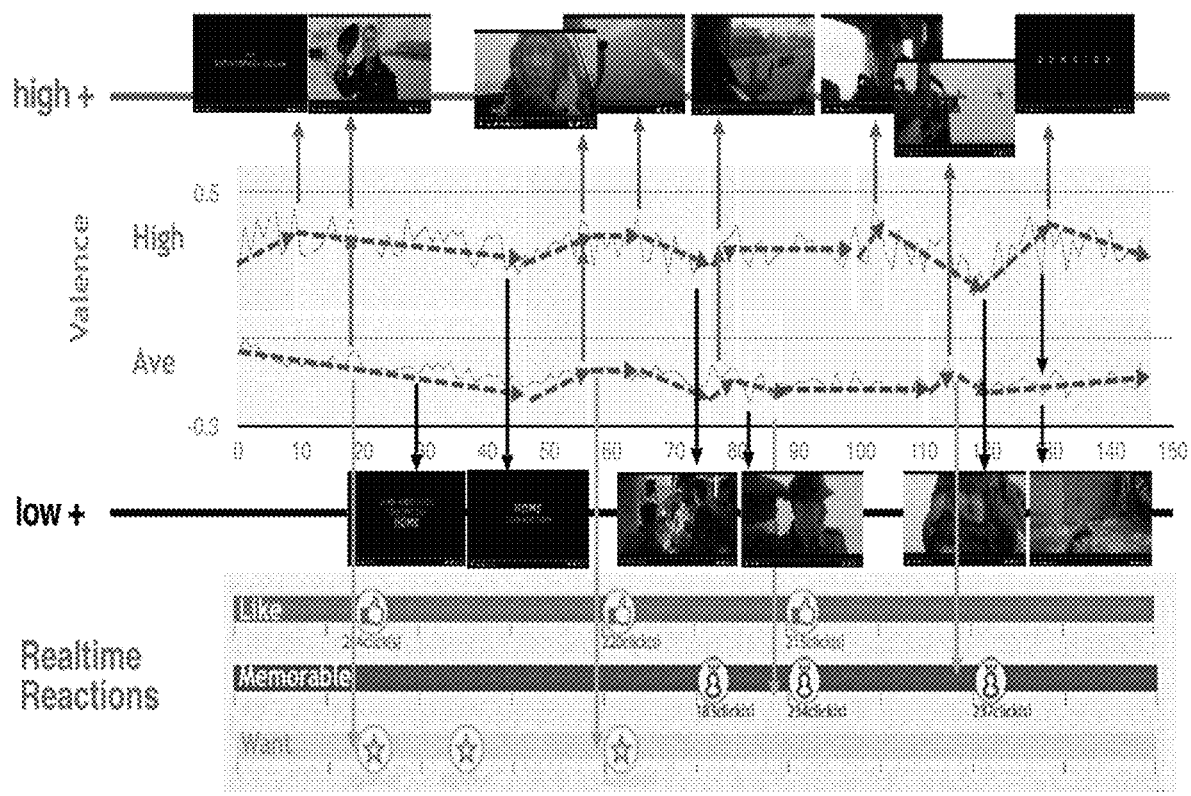
FIG. 11 shows a graphical representation of analysis of the media content by the first set of participants and the second set of participants in accordance with an exemplary embodiment of the present invention.

FIG. 11 shows a graphical representation of analysis of the media content by the first set of participants and the second set of participants. The result of emotion (facial expression) and reaction of the first set of participants and the second set of participants respectively are placed vertically one down another. For the same content, the correlation in the peaks of the Emotion analysis and the reaction analysis is observed. Wherever the time segments or the peaks of these two analysis match, those time segments are identified as segments which are most positive segments or most relevant segments for the entire set of participants. These segments can then be used for creating even more engaging content for the target audience segments for more effective marketing of the same content using very short form digital content.

Figure 12:
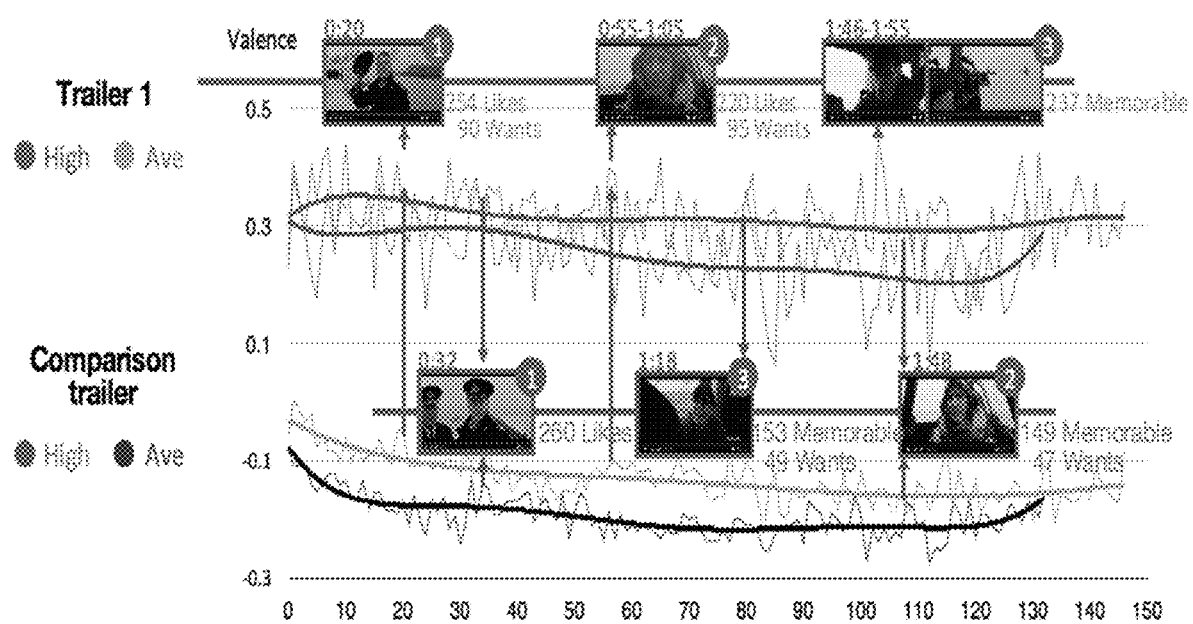
FIG. 12 shows the analysis of two media content with same video frames arranged in a random manner in accordance with an exemplary embodiment of the present invention.

In an embodiment of the present invention the system and method of the present invention can be used to self-validate the analysis of this method. FIG. 12 shows the analysis of two media content with same video frames arranged in a random manner. The two media contents are shown to same set of participants: one set for emotion analysis and second set for reaction analysis. It can be observed in FIG. 12, that with same group of participants, the analysis of both the media content shows three same segments that are of high relevance or interest to the same group of participants.

In an embodiment, the invention could be generalized by doing similar peak analysis of yet another set of people with yet another dimension of Non Verbal Cue capture. For example, the system can ask people to say something as they are watching the digital content. The system would then convert audio into text and do text sentiment analysis at each frame. At the point of the frames where there are peaks in positive sentiments could be identified as points of interest for relevance for the content. This could also then be correlated to the peaks of Emotions and Reactions. In another embodiment the audio captured for each users could be analyzed for audio intonation. The peaks in positive emotion in the intonation analysis for the overall sample average could also be used to correlate with the peaks of Emotions and Reactions for making the final determination. Some other modes of such Non Verbal Cues for doing correlation analysis could be Gestures, Eye Tracking, Head Tracking and possibly feedback from other sensory inputs, if available, that could capture haptic, tactic feedback that could relate to audience engagement or disengagement.

In another embodiment, the segment analysis for emotions and reactions of participants can be segmented based on demographics, age, gender, ethnicity etc. Since the overall system allows targeting people based on narrow demographics, eventually, such relevancy identification could be done based on these narrow demographics as well.

Identification of Demographic Data of Different Emotional Cohorts:

In the emotional analysis we identify 3 different cohorts—most positively reacting cohort, the overall average, and most negative reacting cohort. Once this identification is done, the system can automatically pull the demographic data of most positive and most negative cohort and export this data in a form that could be used for further analysis. An embodiment of this step could be printing out age/gender/ethnicity data of all the people in one cohort. Another embodiment could be generating a bar graph of frequency of occurrence in different major age groups or different gender or ethnicity or any other trait of the user that is available in the system data base. If primary set of information of users is available (for example, e-mails), this information could also be provided. All this information is very useful to the content owner to make subsequent business decisions. One of these decisions could be reaching out to the users for subsequent set of survey questions.

The method and the system of the present invention can be used for finding relevant portion of digital content from within a large piece of digital content. The method can be used to identify most engaging portion of the media content, which can then be used to create short form video or trailer that can help production house in attaining a huge audience. In other instances, the method has its utility in large digital platforms which can used the method to create a heavy dose of entertaining short digital video or audio clips. This helps content creators and brands to recognize which content connects with which audience and helps in micro-targeting people based on their likes, dislikes, emotional reactions, social media comments and any other behavior pattern in relation to a certain context.

In another instances, the method is useful for content creator like movie studios that spend a lot of time and money protecting their new movies and shows. The method can be used to identify the most engaging portion of a video and helps in figuring out how to cut the most important short segments of a trailer that could be used in creating very short segments of the movie in social media before launch. Knowing the segments which have the best emotional and reaction connection with specific audiences helps the movie studio to advertise very effectively, thereby increasing the chances of having a large turnout in movie theatres upon release.

The methods and processes described herein may have fewer or additional steps or states and the steps or states may be performed in a different order. Not all the steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can", "may", "might", "e.g.", and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising", "including", "having", and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z" and "one or more of X, Y, Z" unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, virtual or augmented reality device, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

The invention claimed is:

1. A system for evaluating media content comprising:
   a web-based application to stream a media content to a first set of participants and a second set of participants;
   a server having a processor, and a facial detection engine, the server is configured to:
   receive facial expression of one or more participants of the first set of participants in the form of video recordings and processing by the facial detection engine to identify one or more emotions of the first set of participants in frame-by-frame manner;
   receive reactions of one or more participants in second set of participants, in which the reactions are captured by presenting one or more emojis to the second set of participants while the media content is playing, and asking the second set of participants to click emojis at different time of displayed media content to mark corresponding reactions;
   wherein the server plots a graphical representation of the facial expression captured for the first set of participants and the reactions of second set of participants to identify one or more segment of the media content that are engaging for both the first set of participants and the second set of participants.

2. The system of claim 1, wherein an owner of the media content upload the media content on the server through a campaign using the web-based application.

3. The system of claim 2, wherein the owner of the media content specify the attributes for the first set of participants and the second set of participants, which includes, but are not limited to age, demography, ethnicity, gender, region.

4. The system of claim 1, wherein the one or more emotions identified by the facial detection includes but are not limited to Angry, sad, neutral, fear, surprise, joy and disgust.

5. The system of claim 1, wherein the reactions of the second set of participants include like, dislike, love, memorable and want.

6. The system of claim 1, wherein the server determines one or more segment of interest for the first set of participants by plotting a chart for the average of the emotions of the first set of participants with corresponding intensity in frame by frame manner and identifying slope trends, magnitude trends and peak trends in the chart to identify one or more segment of media content of interest to the first set of participants.

7. The system of claim 1, wherein the server determines one or more segment of interest for the second set of participants by plotting a chart with number of clicks in each time frame and determining one or more segments with highest number of clicks.

8. The system of claim 1, wherein the server determines one or more segments of interest to both the first set of participants and the second set of participants by correlating the chart for the average of emotions of the first set of participants and the chart with number of clicks in each time frame of the second set of participants; and then identifying highest indicators in the chart of the first set of participants and the chart of the second set of participants.

9. A method for evaluating media content comprising:
streaming a media content to a first set of participants and a second set of participants;
providing a server having a processor, and a facial detection engine, the server is configured to:
receive facial expression of one or more participants of the first set of participants in form of video recordings and processing by the facial detection engine to identify one or more emotions of the first set of participants in frame-by-frame manner;
receive reactions of one or more participants in second set of participants, in which the reactions are captured by presenting one or more emojis to the second set of participants while the media content is playing, and asking the second set of participants to click emojis at different time of displayed media content to mark corresponding reactions;
wherein the server plots a graphical representation of the facial expression captured for the first set of participants and the reactions of second set of participants to identify one or more segment of the media content that are engaging for both the first set of participants and the second set of participants.

10. The method of claim 9, wherein an owner of the media content upload the media content on the server through a campaign using the web-based application.

11. The method of claim 10, wherein the owner of the media content specify the attributes for the first set of participants and the second set of participants, which includes, but are not limited to age, demography, ethnicity, gender, region.

12. The method of claim 9, wherein the one or more emotions identified by the facial detection includes but are not limited to Angry, sad, neutral, fear, surprise, joy and disgust.

13. The method of claim 9, wherein the reactions of the second set of participants include like, dislike, love, memorable and want.

14. The method of claim 9, wherein the server determines one or more segment of interest for the first set of participants by plotting a chart for the average of the emotions of the first set of participants with corresponding intensity in frame by frame manner and identifying slope trends, magnitude trends and peak trends in the chart to identify one or more segment of media content of interest to the first set of participants.

15. The method of claim 9, wherein the server determines one or more segment of interest for the second set of participants by plotting a chart with number of clicks in each time frame and determining one or more segments with highest number of clicks.

16. The method of claim 9, wherein the server determines one or more segments of interest to both the first set of participants and the second set of participants by correlating the chart for the average of emotions of the first set of participants and the chart with number of clicks in each time frame of the second set of participants; and then identifying highest indicators in the chart of the first set of participants and the chart of the second set of participants.

* * * * *